(12) United States Patent
Trappier et al.

(10) Patent No.: US 12,486,775 B1
(45) Date of Patent: Dec. 2, 2025

(54) TURBOMACHINE BLADING ASSEMBLY COMPRISING MEANS FOR LIMITING VIBRATION BETWEEN PLATFORMS

(71) Applicants: SAFRAN AIRCRAFT ENGINES, Paris (FR); SAFRAN CERAMICS, Le Haillan (FR)

(72) Inventors: Nicolas Xavier Trappier, Moissy-Cramayel (FR); Didier René André Escure, Moissy-Cramayel (JP); Matthieu Arnaud Gimat, Moissy-Cramayel (FR); Sébastien Serge Francis Congratel, Moissy-Cramayel (FR); Patrick Joseph Marie Girard, Moissy-Cramayel (FR); Arthur De Castro, Moissy-Cramayel (FR); Patrice Jean-Marc Rosset, Moissy-Cramayel (FR); Baptiste Dorian Lawniczek, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/877,899

(22) PCT Filed: Jun. 12, 2023

(86) PCT No.: PCT/FR2023/050848
§ 371 (c)(1),
(2) Date: Dec. 20, 2024

(87) PCT Pub. No.: WO2023/247857
PCT Pub. Date: Dec. 28, 2023

(30) Foreign Application Priority Data

Jun. 22, 2022 (FR) ...................................... 2206153

(51) Int. Cl.
*F01D 5/22* (2006.01)

(52) U.S. Cl.
CPC .......... *F01D 5/225* (2013.01); *F05D 2240/80* (2013.01); *F05D 2260/96* (2013.01)

(58) Field of Classification Search
CPC ......... F01D 5/225; F01D 5/22; F05D 2260/96
See application file for complete search history.

(56) References Cited

U.S. PATENT DOCUMENTS

| 10,989,059 | B2 * | 4/2021 | Clark | F02K 3/06 |
| 2012/0141259 | A1 * | 6/2012 | Boeck | F01D 5/225 |
| | | | | 415/182.1 |
| 2017/0356298 | A1 * | 12/2017 | Carty | F01D 9/042 |

FOREIGN PATENT DOCUMENTS

| EP | 0284829 A1 | 10/1988 |
| EP | 0899426 A2 | 3/1999 |

(Continued)

OTHER PUBLICATIONS

Search Report for International Application No. PCT/FR2023/050848 dated Aug. 10, 2023.

*Primary Examiner* — Michael L Sehn
(74) *Attorney, Agent, or Firm* — McDonald Hopkins LLC

(57) ABSTRACT

A bladed assembly (10) includes two adjacent blades (12). Each blade (12) a platform (16) located at a free radial end. The platform (16) of the first blade (12) includes a lateral face (18) which is located circumferentially opposite an associated lateral face (18) of the platform (16) of the second blade (12). The platform (16) of the second blade (12) comes into contact with the platform (16) of the second blade (12) only via an excrescence (20) which projects circumferentially with respect to the lateral face (18) of the platform (16) of the first blade (12) in the direction of the platform (16) of (Continued)

the second blade (12), and the excrescence (20) is received in a groove (22) formed in the platform (16) of the second blade.

6 Claims, 5 Drawing Sheets

(56) References Cited

FOREIGN PATENT DOCUMENTS

| | | |
|---|---|---|
| EP | 2460979 A1 | 6/2012 |
| EP | 2612996 A1 | 7/2013 |
| EP | 3597861 A1 | 1/2020 |
| FR | 2612249 A1 | 9/1988 |
| GB | 2551164 A | 12/2017 |
| WO | 2012041651 A1 | 4/2012 |

* cited by examiner

TURBOMACHINE BLADING ASSEMBLY COMPRISING MEANS FOR LIMITING VIBRATION BETWEEN PLATFORMS

CROSS-REFERENCE TO RELATED APPLICATIONS

This is the National Stage application of PCT international application PCT/FR2023/050848, filed on Jun. 12, 2023, which claims the priority of French Patent Application No. 2206153, filed Jun. 22, 2022, both of which are incorporated herein by reference in their entireties.

TECHNICAL FIELD

The invention relates to a turbomachine assembly designed so as to achieve damping of the vibrations that take place at the level of the outer radial ends of movable blades by cooperation with one another.

The invention aims to improve the existing solutions.

PRIOR ART

During the operation of a turbomachine, the blades, and more particularly the movable blades, are subjected to various vibrations.

In general, these vibrations are the highest at the level of the free radial end of each blade, commonly so-called the "platform".

To limit the amplitude of the vibrations at the level of the platforms, it has been proposed to assemble the blades with a torsional preloading of the blades.

During operation of the turbomachine, the aforementioned preload, associated with a particular mounting produces frictional forces allowing reducing the amplitude of the vibrations.

This mounting implies particular shapes of the platforms of the blades, to interlock in a predefined manner.

However, because of the rotation of the blade in either direction, or a modification of the relative position of the platforms of the blades, the contact force between the platforms could vary, which might be detrimental to damping of the vibrations.

In addition, in the case of blades made of a CMC (ceramic matrix composite) material, this material does not allow having as high torsional preloads in comparison with other materials. Such preloads induce high static stresses which might exceed those acceptable by the material.

Document FR-A-2.612.249 describes a set of blades whose platforms cooperate with one another to bear against one another to produce frictional forces at specific contact points.

This document further describes that the platforms include additional contacts made by extensions of a heel that bears against an associated face of the other platform.

Such an embodiment makes the design of the platform particularly complex since there are several contact areas to be provided for to achieve damping of the vibrations.

The invention aims to provide a turbomachine assembly which is designed so as to enable damping of the vibrations by frictions without having to preload the blades upon assembly.

DESCRIPTION OF THE INVENTION

The invention provides a turbomachine blading extending around a main axis A and including at least one first blade and one second blade circumferentially adjacent, each of the first blade and of the second blade including a vane extending according to a direction of radial extension with respect to said main axis A and a platform located at a free radial end of the vane, wherein the platform of the first blade includes a lateral face which is located circumferentially opposite an associated lateral face of the platform of the second blade, characterised in that the platform of the first blade is intended to come into contact with the platform of the second blade, during operation of the turbomachine, only via an excrescence which projects circumferentially with respect to the lateral face of the platform of the first blade in the direction of the platform of the second blade, and in that the excrescence is received in a groove formed in the platform of the second blade.

The contact of the platforms with one another only via the cooperation of the excrescence with the groove allows simplifying assembly and not preloading the assembly before use.

Preferably, the groove formed in the second blade and which is associated with the excrescence of the first blade is circumferentially open into a lateral face of the platform of the second blade in the direction of the platform of the first blade.

Preferably, the excrescence of the first blade includes at least one face which bears against an opposite face of the groove of the second blade.

Preferably, each of the excrescence and of the groove extends in a plane substantially perpendicular to a radial direction with respect to the main axis A, and in that the excrescence includes a radially outer face which is oriented radially outward and which bears radially against a bottom face of the groove which is oriented radially inward.

Preferably, the groove of the second blade is axially delimited by two lateral faces against which the excrescence of the first blade is able to axially bear.

Preferably, the excrescence and the groove are axially located substantially at the middle of the platform that is associated therewith.

Preferably, each of the platform of the first blade and of the platform of the second blade includes an excrescence at a circumferential end and a groove at its other circumferential end.

Preferably, the excrescence is arranged at a circumferential end of the platform of the first blade or of the second blade which is located on the intrados side of the vane of said first or second blade.

Preferably, the excrescence of the first blade is received with an axial clearance in the groove of the second blade that is associated therewith.

Preferably, the circumferential length of the groove is comprised between 2.5 and 6 millimetres and the width of the excrescence, measured according to an axial direction, is comprised between 2.5 and 8 millimetres.

Preferably, the excrescence projects radially outward with respect to the rest of the platform and the groove is formed in a radial excrescence projecting radially outward with respect to the rest of the platform the second blade.

The invention also relates to an aircraft turbomachine including a bladed assembly according to the invention.

DETAILED DISCLOSURE OF THE INVENTION

A portion of a turbomachine bladed assembly 10 consisting of a plurality of blades 12 is shown in the figures. Preferably, the turbomachine including the bladed assembly 10 is an aircraft turbomachine.

Figure 8:
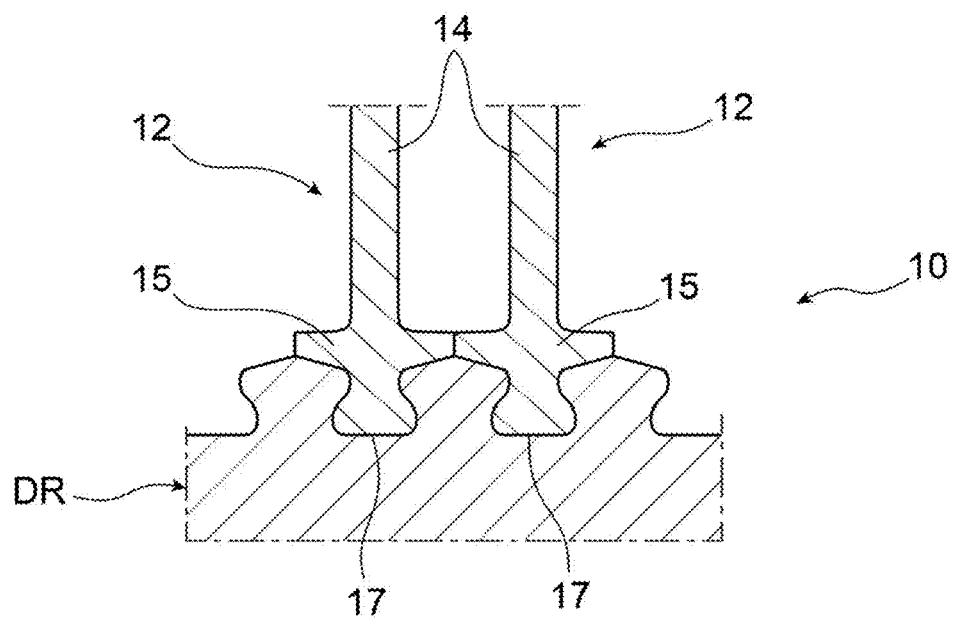
FIG. 8 is a partial view of a turbomachine rotor element equipped with a bladed assembly according to the invention.

Preferably, this bladed assembly 10 is a component belonging to a rotor disk of the turbomachine such as the rotor disk DR a portion of which is shown in FIG. 8. The blades 12 can then be mounted by their roots in corresponding cells of this disk DR thereby forming a crown of blades which surround the disk DR while being carried by the latter.

In this case, and according to a non-limiting embodiment, the blades 12 are movable blades of a low-pressure turbine of a turbomachine. It should be understood that the invention is not limited to this embodiment and that it could also relate to movable blades of other modules of the turbomachine or fixed blades.

The bladed assembly 10 has a main axis A which is intended to be coincident, or coaxial with the main axis of the turbomachine when the bladed assembly 10 is mounted in the latter.

Each blade 12 includes a vane 14 extending according to a radial direction with respect to the main axis, a first radial end portion 15, so-called the root end, which is connected to a first radial end of the vane 14 and a second radial end portion 16, so-called the platform, which is connected to a second radial end of the vane 14.

Preferably, the platform 16 is connected to the free radial end of the vane 14, i.e. the radial end of the vane 14 which is not fastened to a support rotary element of the blades 12.

Thus, according to the embodiment shown in the figures, the platform 16 is located at the outer radial end of the vane 14. The inner radial end of the vane 14 bearing the root 15 of the blade 12, by which the blade is mounted on the support element. As shown in FIG. 8 and, as a preferred yet non-limiting example, the root 15 of the blade 12 is mounted in a cell 17 of the disk of the rotor DR of the turbomachine.

The outer radial end of the blade 12, which is opposite to the root 15 for fastening the blade 12 to the rotor, further includes sealing lips (not shown).

It should be understood that the invention is not limited to this embodiment and that the platform could be located at the inner radial end of the vane 14 when the blade 12 is fastened to the support element by its outer radial end.

The bladed assembly 10 shown in the figures consists of two blades 12 which are circumferentially adjacent in the turbomachine, namely a first blade located to the left in the figures, and a second blade 12 located to the right in the figures.

In particular, the platforms 16 of the blades 12 are located proximate to one another according to a circumferential direction.

The platform 16 of the first blade 12 includes a lateral face 18 which is located circumferentially opposite and at a distance from a lateral face 18 of the platform 16 of the second blade 12, which is associated therewith. In this case, the two opposite lateral faces 18 are parallel to one another and are inclined with respect to a plane passing through the main axis A of the bladed assembly 10.

During a rotation of the bladed assembly 10 about its main axis A, in particular during operation of the turbomachine, the centrifugal action created thereby causes the platform 16 of the first blade 12 to come into contact with the platform 16 of the second blade 12.

For this purpose, the platform 16 of the first blade 12 includes an excrescence/protrusion 20 which is received and cooperates with an associated groove 22 formed in the platform 16 of the second blade 12.

The cooperation of the excrescence 20 with the groove 22 associated therewith allows, during operation of the turbomachine, generating frictional forces limiting the vibrations of the platforms 16.

According to one embodiment, the two platforms 16 are in contact with one another only via the excrescence 20 and the groove 22.

The excrescence 20 projects with respect to the lateral face 18 of the platform 16 of the first blade 12, according to the circumferential direction and in the direction of the platform 16 of the second blade 12. The excrescence 20 further extends in a plane substantially perpendicular to the radial direction, i.e. in a plane parallel to the main axis A and parallel to the circumferential direction.

The excrescence 20 includes a radially outer face 24 oriented radially outward, two lateral faces 26, considered according to the axial direction, and an end face 28 located at the free circumferential end of the excrescence 20.

The groove 22 too extends in a plane substantially perpendicular to the radial direction, i.e. in a plane parallel to the main axis A and parallel to the circumferential direction.

It opens circumferentially into the lateral face 18 of the platform 16 of the second blade 12 which faces the platform 16 of the first blade 12 in order to receive the excrescence 20 borne by the first blade 12.

The groove 22 further opens radially inward.

Thus, the groove 22 includes a bottom face 30 oriented radially inward, two lateral faces 32 considered according to the axial direction and a circumferential end face 34.

According to a preferred embodiment, the excrescence 20 and the groove 22 are located axially substantially at the middle of the platform 16 that is associated therewith.

According to the embodiment shown in FIGS. 2 to 5, the excrescence 20 is located radially in the plane of the rest of the platform 16 of the first blade 12 and the groove 22 consists of a cavity formed in the platform 16 of the second blade 12.

Figure 5:
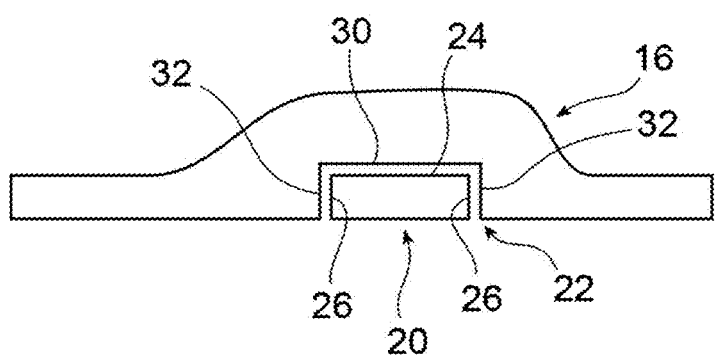
FIG. 5 is a section according to a radial plane passing through the main axis A of the bladed assembly shown in FIG. 1.

As shown in more detail in FIG. 5, the platform of the second blade 12 includes a boss 36 extending radially outward and which is located at the level of the groove 22 of the platform 16. This boss is intended to locally increase the amount of material of the platform 16, thereby improving its mechanical strength.

Figure 6:
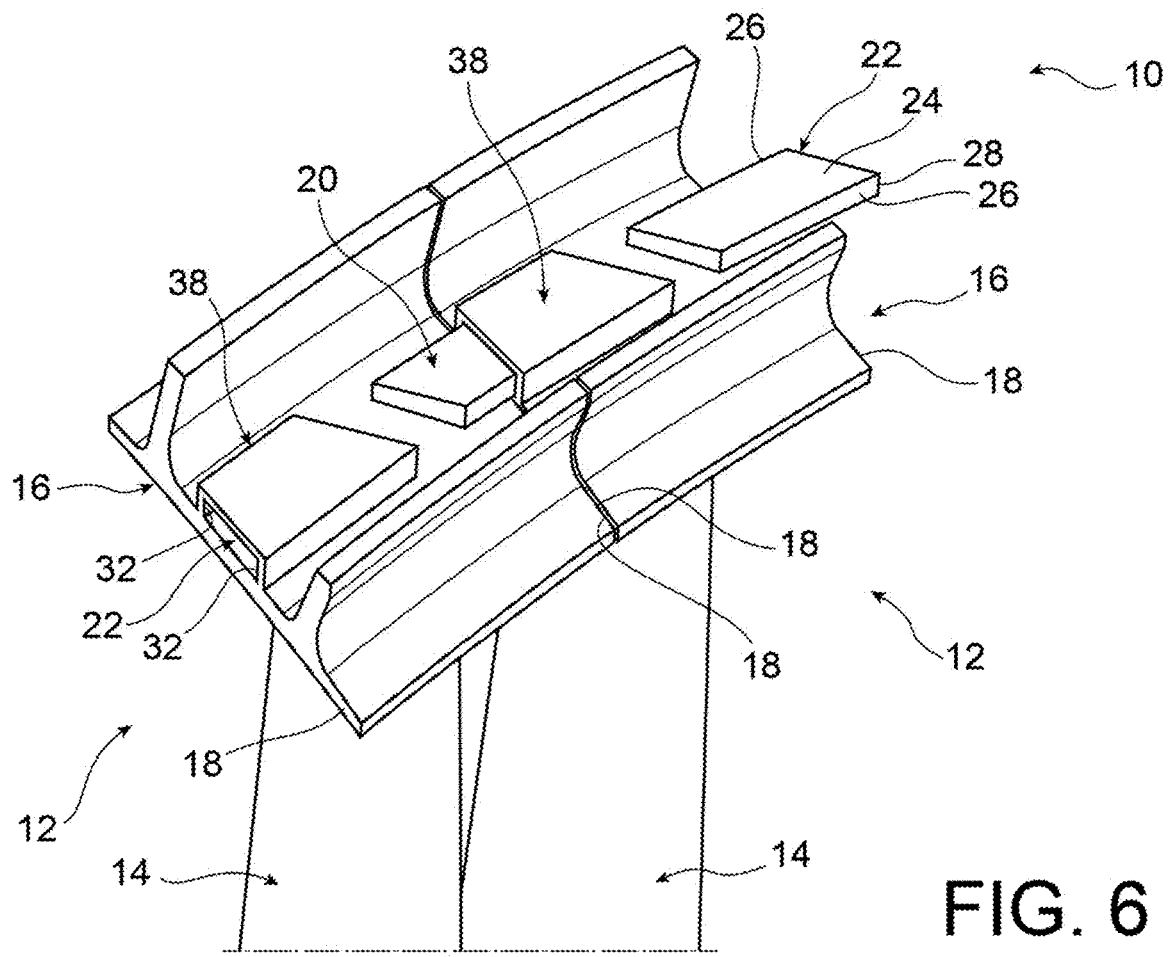
FIG. 6 and FIG. 7 are views similar to those of FIGS. 1 and 2, illustrating another embodiment of the invention.
Figure 7:
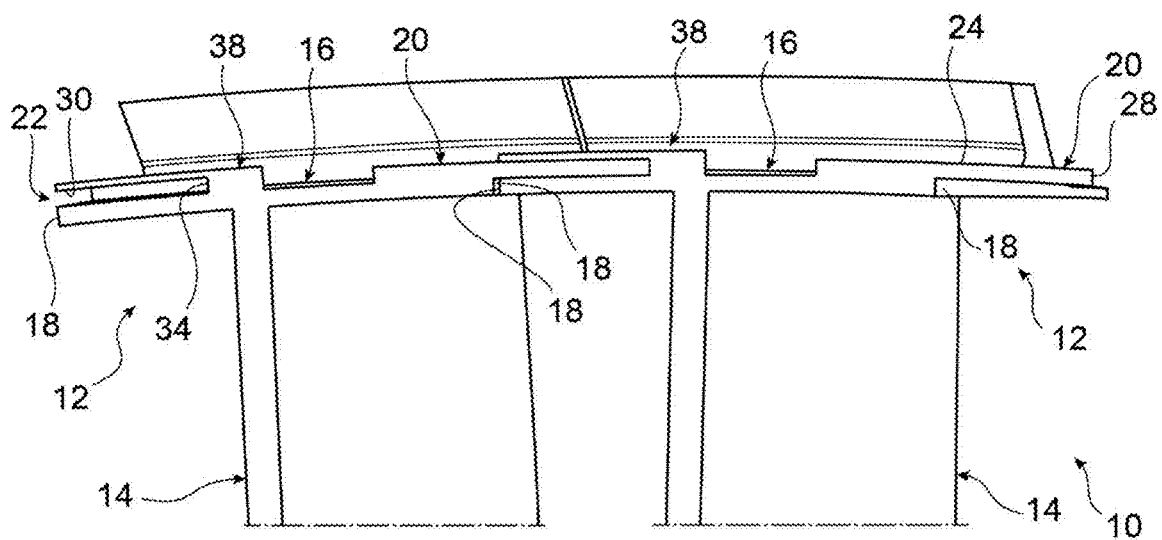

According to another embodiment shown in FIGS. 6 and 7, the excrescence 20 projects radially outward with respect to the rest of the platform 16. The same applies to the groove 22 which is formed in a radial excrescence 38 projecting radially outward with respect to the rest of the platform 16 of the second blade 12.

According to this other embodiment, the groove 22 opens only circumferentially at the level of the lateral face 18 of the platform 16 of the second blade 12 which faces the platform 16 of the first blade 12.

The radial thickness of the groove 22 is substantially larger than the radial thickness of the excrescence 20, to enable assembly of the blades 12 with one another.

Preferably, the excrescence 20 and the groove 22 are made by machining the platform, in particular when the blade 12 is made of a CMC material During operation of the turbomachine, the forces acting on the platforms 16, in particular the centrifugal force, cause deformations of these, resulting in particular in a radial movement of each excrescence 20 that is more significant than the rest of the blade 12 to which the excrescence 20 belongs, i.e. the first blade 12. This phenomenon is even more significant when the excrescence 20 is borne by an intrados circumferential end of the platform 16 of the first blade 12, with reference to the direction of flow of a gas flow (not shown) in the turbomachine.

As mentioned before, the excrescence 20 which is borne by the platform 16 of the first blade 12 is received in the opposite groove 22 which is formed in the platform 16 of the second blade 12. The radial movement of the excrescence 20 leads to a radial bearing of the radially outer face 24 of the excrescence 20 against the bottom face 30 of the groove 22, radially outward.

Also, during operation of the turbomachine, the platforms 16 are subjected to vibrations, in particular in a plane perpendicular to the radial direction. The radial bearing of the radially outer face 24 of the excrescence 20 against the bottom face 30 of the groove 22 produces frictional forces according to directions perpendicular to the radial direction, thereby counteracting the vibrations of the platforms 16.

Furthermore, when the excrescence 20 is received in the groove 22, the two lateral faces 26 are located axially opposite the lateral faces 32 of the groove 22.

According to a preferred embodiment, an axial clearance is present between the lateral faces 26, 32 opposite one another and, during operation of the turbomachine, the excrescence 20 is able to come into contact against either one of the two lateral faces 32 of the groove 22, to limit the amplitude of the relative vibrations of the two platforms 16.

According to a preferred embodiment, each platform 16 of the set of blades 12 of the bladed assembly 10 includes an excrescence 20 on a first circumferential side, preferably the intrados side, and includes a groove 22 on the other circumferential side.

Thus, each platform 16 cooperates with the two platforms 16 that are circumferentially adjacent thereto to limit vibrations.

As a non-limiting example, the circumferential depth of the groove 22, i.e. the distance between the lateral face 18 into which the groove 22 opens and the circumferential end face 34 of the groove 22 is larger than 2.5 mm, to ensure enough damping while taking account of the tolerances and the operating clearances and is smaller than 6 mm to guarantee a good mechanical strength of the platform 16.

According to another example, the circumferential length of the excrescence 20 and of the groove 22 is comprised between 1 mm and 50% of the circumferential length of the platform 16.

The axial width of the excrescence 20, i.e. the axial distance between the lateral faces 26 is larger than 2.5 mm to ensure enough damping while taking account of the tolerances and the operating clearances, and it is smaller than 8 mm to guarantee a good mechanical strength of the excrescence 20. In any case, it is smaller than the axial length of the platform 16.

Figure 1:
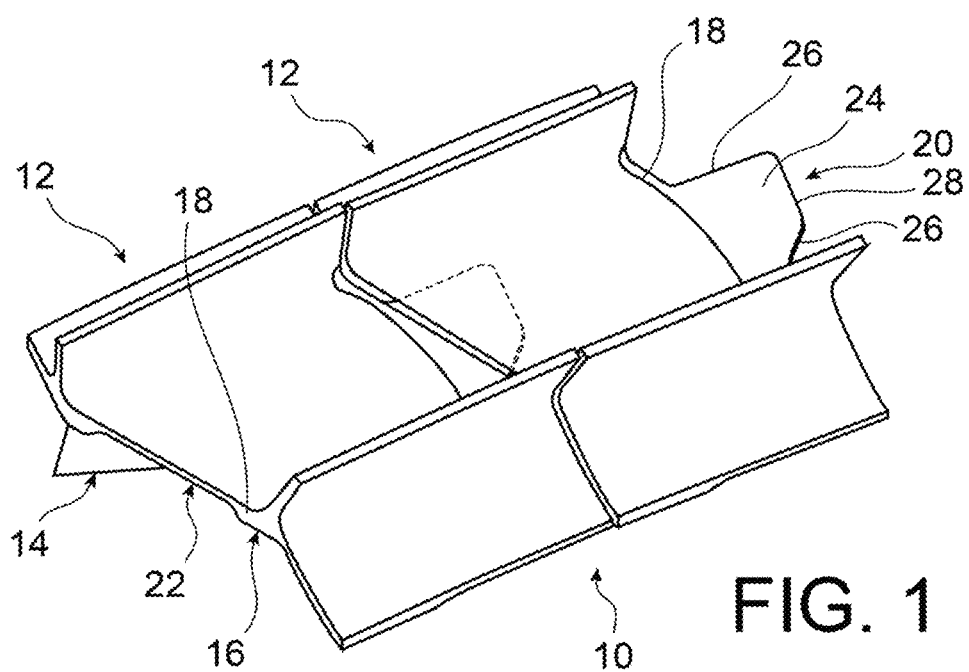
FIG. 1 is a schematic perspective representation of a bladed assembly including two blades connected to one another by an excrescence and a groove according to the invention.
Figure 2:
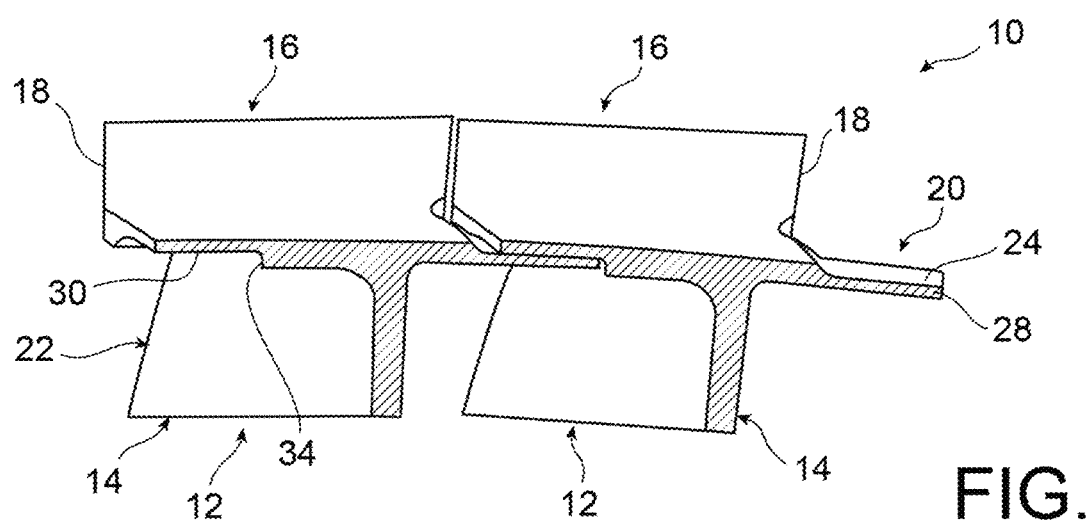
FIG. 2 is a section of the bladed assembly shown in FIG. 1, according to a plane perpendicular to the main axis of the bladed assembly.
Figure 3A:
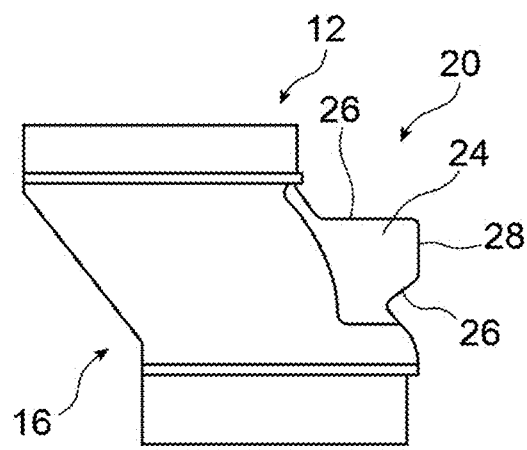
FIG. 3A is a view according to an inward radial direction of a blade shown in FIG. 1.
Figure 3B:
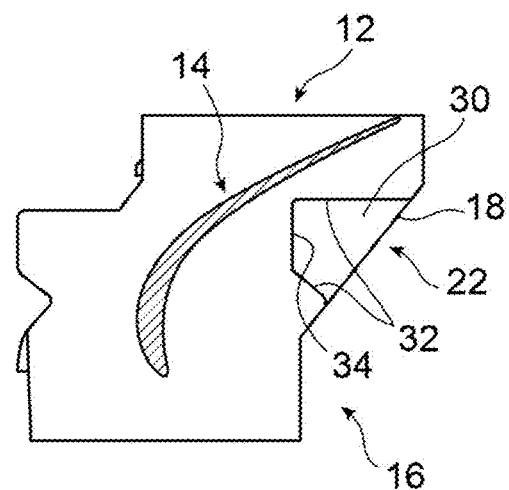
FIG. 3B is a view according to an outward radial direction of the blade shown in FIG. 3A.
Figure 4:
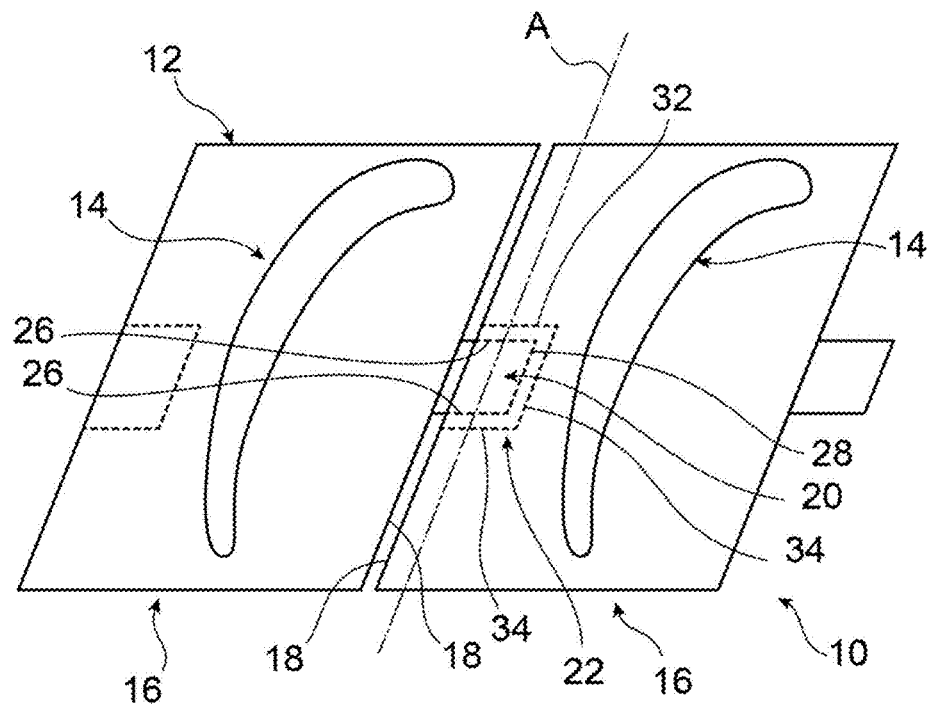
FIG. 4 is a view according to an inward radial direction of the bladed assembly shown in FIG. 1.

As shown in FIG. 3A, the excrescence 20 is generally inclined with respect to the platform 16 and more particularly with respect to the lateral face 18. The same applies to the groove 22 which is inclined with respect to the lateral face 18 of the platform 16 of the second blade 12.

The invention claimed is:

1. A turbomachine bladed assembly extending around a main axis and including at least one first blade and one second blade circumferentially adjacent,
    each of the first blade and the second blade including a vane extending according to a direction of radial extension with respect to said main axis and including a platform located at a free radial end of the vane,
    wherein the platform of the first blade includes a lateral face which is located circumferentially opposite an associated lateral face of the platform of the second blade,
    wherein the platform of the first blade is intended to come into contact with the platform of the second blade, during operation of the turbomachine, only via an excrescence which projects circumferentially with respect to the lateral face of the platform of the first blade in the direction of the platform of the second blade, and in that the excrescence is received in a groove formed in the platform of the second blade,
    wherein each of the excrescence and the groove extends in a plane substantially perpendicular to a radial direction with respect to the main axis, the excrescence including a radially outer face which is oriented radially outward and which bears radially against a bottom face of the groove which is oriented radially inward, and
    wherein the excrescence and the groove are axially located substantially at the middle of the platform that is associated therewith.

2. The turbomachine bladed assembly according to claim 1, wherein the groove formed in the second blade and which is associated with the excrescence of the first blade is circumferentially open into a lateral face of the platform of the second blade in the direction of the platform of the first blade.

3. The turbomachine bladed assembly according to claim 1, wherein the excrescence of the first blade includes at least one face which bears against an opposite face of the groove of the second blade.

4. The turbomachine bladed assembly according to claim 1, wherein the groove of the second blade is axially delimited by two lateral faces against which the excrescence of the first blade is able to axially bear.

5. The turbomachine bladed assembly according to claim 1, wherein each of the platform of the first blade and the platform of the second blade includes an excrescence at a circumferential end and a groove at its other circumferential end.

6. The turbomachine bladed assembly according to claim 1, wherein the excrescence is arranged at a circumferential end of the platform of the first blade or of the second blade, the circumferential end being located on the intrados side of the vane of said first or second blade.

* * * * *